July 8, 1930.  N. C. HUSTED  1,770,137
HANDLE CONSTRUCTION
Filed June 8, 1925
FIG.1.
FIG.2.
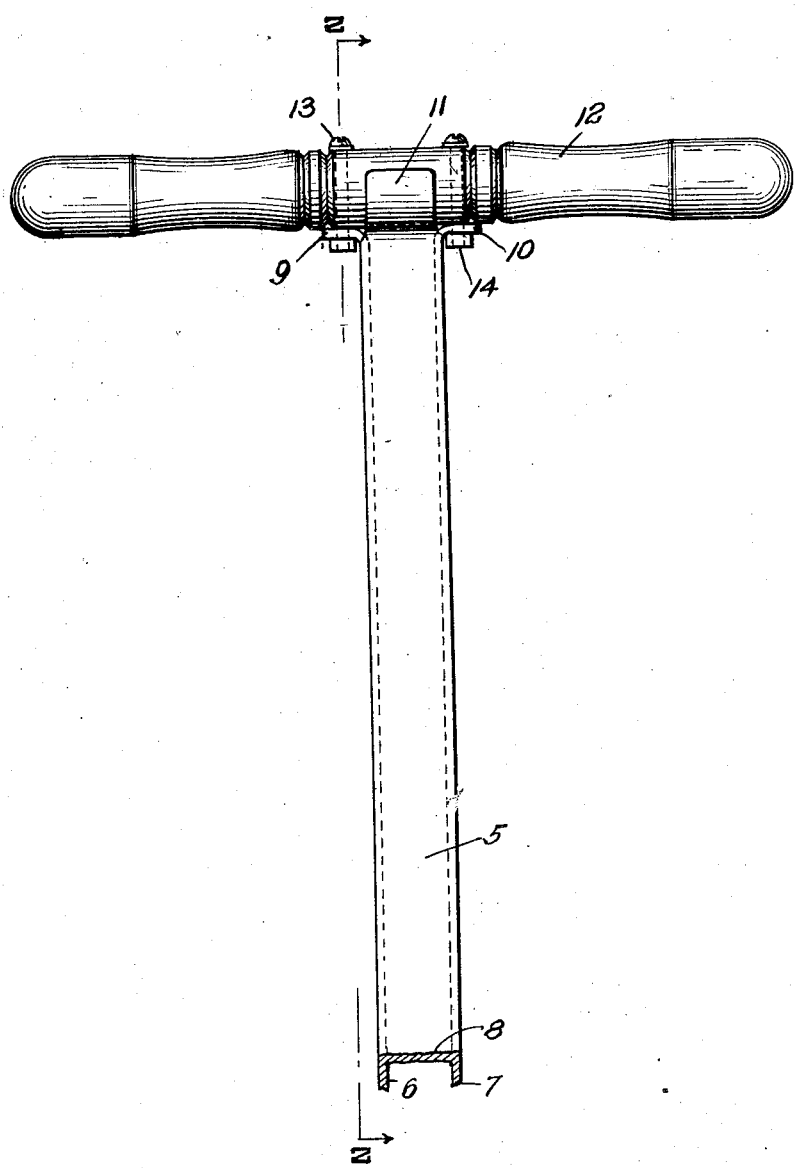
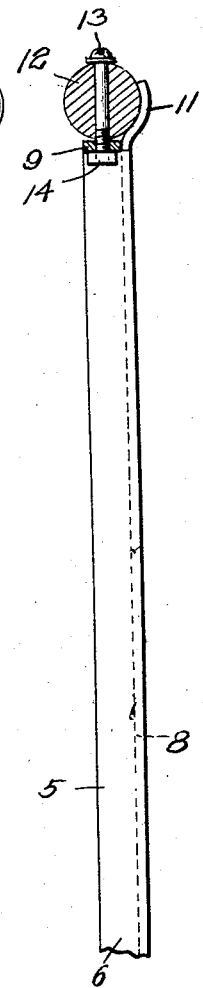
WITNESS
J. Herbert Bradley.
INVENTOR
Norris C. Husted
By Green & McCallister
His Attorneys Patented July 8, 1930

1,770,137

UNITED STATES PATENT OFFICE

NORRIS C. HUSTED, OF NILES, OHIO

HANDLE CONSTRUCTION

Application filed June 8, 1925. Serial No. 35,580.

This invention relates to manually operated implements such, for example, as lawn mowers and more particularly to an improved form of handle for such implements.

In the manufacture of this type of device it has been heretofore customary to secure a handle or grip to a saddle member which was in turn fastened to the end of a handle bar, generally of wood, extending up from the implement. Such a construction is comparatively expensive to manufacture and difficult to assemble, due to the necessary number of parts required, and an object of this invention is to provide a device of the type set forth in which the number of parts and the time required for assembling are materially reduced.

A further object of this invention is to provide a handle for manually operated implements, in which the grip is rigidly secured directly to the handle bar.

A still further object is to provide a handle of the type set forth wherein the handle bar can be conveniently made of metal and the handle or grip can be rigidly secured to the bar.

A still further object is to provide a device of the type set forth which will be cheap to manufacture and assemble and rugged and durable in operation.

These and other objects which will be obvious to those skilled in this particular art are accomplished by means of this invention, one embodiment of which is illustrated in the drawings, in which Figure 1 is a view in front elevation of a handle constructed in accordance with one form of this invention and Fig. 2 is a view in side elevation, partly in section on the line 2—2 of Fig. 1.

In the particular embodiment of this invention which is illustrated in the drawings the handle bar 5, the lower end of which is adapted to be secured directly to the mower or other implement, is formed of a metal channel having side flanges 6 and 7 and web 8. At the upper end the side flanges are bent outwardly in opposite directions to form spaced, perforated, handle supporting seats 9 and 10. Intermediate these seats the web 8 is curved outwardly and upwardly, as indicated at 11, so as to contact with, and partially embrace, a handle or grip 12 which is secured to the seats by means of bolts 13 and nuts 14.

Obviously the grip may be of any desired cross section and the web 11 shaped accordingly, and the grip may be secured to the seats 9 and 10 by any desired fastening means.

What I claim and desire to secure by Letters Patent is:

In combination, a channel bar, the side flanges of which are bent outwardly at one end to form spaced grip supporting seats and a grip secured to said seats, the web of said channel bar being bent so as to partially embrace said grip.

In testimony whereof, I have hereunto subscribed my name this 5th day of June, 1925

NORRIS C. HUSTED.